(12) United States Patent
Zhang et al.

(10) Patent No.: US 10,188,995 B2
(45) Date of Patent: *Jan. 29, 2019

(54) METHOD FOR PREPARING COMPOUND DISPERSOIDS OF HYDROPHOBIC NANOPARTICLES AND SURFACTANTS

(71) Applicant: CHINA UNIVERSITY OF PETROLEUM, Qingdao (CN)

(72) Inventors: Chao Zhang, Qingdao (CN); Zhaomin Li, Qingdao (CN); Peng Wang, Qingdao (CN); Qian Sun, Qingdao (CN); Quanwei Dong, Qingdao (CN)

(73) Assignee: CHINA UNIVERSITY OF PETROLEUM, Qingdao (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/047,365

(22) Filed: Jul. 27, 2018

(65) Prior Publication Data

US 2018/0333692 A1  Nov. 22, 2018

Related U.S. Application Data

(62) Division of application No. 14/917,875, filed on Mar. 9, 2016, now Pat. No. 10,071,349.

(51) Int. Cl.
| | |
|---|---|
| *B01F 11/02* | (2006.01) |
| *B01F 15/06* | (2006.01) |
| *B01F 15/02* | (2006.01) |
| *B01F 5/10* | (2006.01) |
| *B01F 5/06* | (2006.01) |
| *B01F 15/00* | (2006.01) |
| *C09K 8/38* | (2006.01) |

(52) U.S. Cl.
CPC ............ *B01F 11/02* (2013.01); *B01F 5/0691* (2013.01); *B01F 5/10* (2013.01); *B01F 11/0258* (2013.01); *B01F 15/00136* (2013.01); *B01F 15/00396* (2013.01); *B01F 15/00993* (2013.01); *B01F 15/0243* (2013.01); *B01F 15/0247* (2013.01); *B01F 15/066* (2013.01); *B01F 2215/0081* (2013.01); *C09K 8/38* (2013.01)

(58) Field of Classification Search
CPC ........................................................ B01F 11/02
USPC ...................... 366/118, 127, 136, 137, 182.2
See application file for complete search history.

(56) References Cited

U.S. PATENT DOCUMENTS

| | | | |
|---|---|---|---|
| 8,215,822 B2* | 7/2012 | Koenig | B01F 11/0258 366/118 |
| 2008/0062811 A1* | 3/2008 | Janssen | B01F 5/0618 366/127 |

* cited by examiner

*Primary Examiner* — David L Sorkin
(74) *Attorney, Agent, or Firm* — CBM Patent Consulting, LLC (57) ABSTRACT

An apparatus for preparing compound dispersoids of hydrophobic nanoparticles and surfactants, comprises a water supply pipeline, a compounding mixing pipeline and an aggregating pipeline; the compounding mixing pipeline comprises an ultrasonic dispersion instrument and a liquid storage tank connected in series into a loop, and a second plunger pump allowing unidirectional circulation of materials is arranged between the ultrasonic dispersion instrument and the liquid storage tank; the water supply pipeline is connected to the top of the ultrasonic dispersion instrument; and the aggregating pipeline is connected to a discharge end of the liquid storage tank.

1 Claim, 5 Drawing Sheets

METHOD FOR PREPARING COMPOUND DISPERSOIDS OF HYDROPHOBIC NANOPARTICLES AND SURFACTANTS

This application is a divisional application of U.S. application Ser. No. 14/917,875 filed on Mar. 9, 2016 claims priority to the U.S. national phase of International Application No. PCT/CN2015/078500 Filed on May 7, 2015 which designated the U.S. and claims priority to Chinese Application Nos. 201510016949.5 filed on Jan. 13, 2015, the entire contents of each of which are hereby incorporated by reference.

TECHNICAL FIELD

The present invention relates to an apparatus for preparing compound dispersoids of hydrophobic nanoparticles and surfactants and an application thereof, which belong to the technical field in which the nanoparticles improve foam stability in collaboration with the surfactants.

BACKGROUND ART

As intelligent fluid, foam is widely used in the development field of oil and gas fields, covering various aspects, such as well drilling, well cementing, operation of oil and gas wells, well stimulation measures and increase in recovery efficiency. However, in the process of the application of foam to the development of the oil and gas fields, due to its thermodynamic instability, the foam is particularly easy to shatter in a flow process, so that profile control, blocking and other features of the foam are degraded greatly. Therefore, the key link of utilizing the foam to help the development of the oil and gas fields efficiently is to improve foam stability.

The booming of nano technology provides an extremely wide potential application scope ranging from electronics, communications, biology to energy sources for nano materials. As the nanoparticles have small sizes, great volume and surface effects, strong adsorbability and other features, people have proposed a method of utilizing the compounding of the nanoparticles and surfactants to collaboratively improve the foam stability. The method has the main advantages: the adsorption of the nanoparticles in a gas-liquid interface can inhibit the occurrence of the phenomena of coalescence and disproportionation of the foam; and the nanoparticles form bridging structures in a gas bubble liquid membrane to improve the foam stability.

As Zhang Shuiyan points out in her doctoral dissertation *Foam Stabilized by Hectorite and HMHEC in Collaboration with Surfactants*, hydrophilic hectorite particles and surfactant cetyl trimethyl ammonium bromide (CTAB) have a very good effect of stabilizing the foam through collaboration under the condition of an appropriate ratio, and a mechanism of stabilizing foam through collaboration is as follows: CTAB adsorbs on hectorite, so that the hydrophilicity of the hectorite particles is changed, thus making the hectorite particles have appropriate hydrophilicity and hydrophobicity and realizing the effect of stabilizing the foam through collaboration. Bernard P. Binks et al. have studied the mechanism of stabilizing the foam through collaboration of hydrophilic nano silica particles with surfactant didecyldimethylammonium bromide (di-$C_{10}$DMAB), and pointed out that under the condition of an appropriate di-$C_{10}$DMAB concentration, a wetting angle of the hydrophilic nano silica particles can be changed from 8° to 63°, thus increasing the hydrophobicity. Moreover, by exactly increasing their hydrophobicity to a certain extent, the two can collaborate to stabilize the foam [Soft Matter, 2008, 4(12): 2373-2382]. Sun Qian et al. have studied the mechanism of stabilizing the foam through collaboration of partially hydrophobic nano silica particles with surfactant lauryl sodium sulfate (SDS), and pointed out that the nano silica particles and SDS under the condition of an appropriate ratio can obviously improve the foam stability, thus increasing the recovery efficiency of crude oil [Energy & Fuels, 2014, 28(4): 2384-2394].

Chinese Patent CN102746841A discloses a compound foam system added with nanoparticles for oil and gas fields and a preparing method thereof. It discloses the method for preparing the compound foam system through the compounding of modified nano silica particles and lauryl sodium sulfate.

It can be found based on the above research that in the process of stabilizing the foam through collaboration of the nanoparticles with the surfactants, hydrophobicity and an electric feature of the particles are two important factors, and the hydrophobicity of the particles is more important. Only when the nanoparticles are in an appropriate hydrophobicity (the foam cannot be stabilized by extreme hydrophobicity either, and the wetting angle is preferred at 60°~420°), can the foam be stabilized optimally. Therefore, people mainly employ compounding of the hydrophilic nanoparticles with the surfactants to change the hydrophilicity and hydrophobicity of the hydrophilic nanoparticles by the adsorbing of the surfactants on the surface of the hydrophilic nanoparticles, thereby obtaining a stable foam system. The method of compounding the hydrophobic nanoparticles with the surfactants to reduce the hydrophobicity of the hydrophobic nanoparticles and enhance the foam stability is rarely employed, which is mainly caused by the fact that when the hydrophobic nanoparticles are compounded with the surfactants, due to the hydrophobicity of the hydrophobic nanoparticles, there is no way to form a dispersion solution of the hydrophobic nanoparticles and the surfactants, and further there is no way to compound and stabilize the foam. In order to form the dispersion solution of the hydrophobic nanoparticles and the surfactants, Chinese patent CN102746841A employs the method of adding absolute ethyl alcohol as an additive. But when the amount of the added absolute ethyl alcohol is less, it is particularly easy for the nanoparticles to produce coalescence in the dispersion solution, which then influences the foam stabilizing effect, increases the amount of use, and virtually increases a production cost. When the amount of the added absolute ethyl alcohol is more, the absolute ethyl alcohol is an antifoam agent, and thus loses the foam stabilizing effect.

Therefore, whether it is possible to find an appropriate method to disperse the hydrophobic nanoparticles into water to form a compounding system with the surfactants so as to increase the utilization efficiency of the nanoparticles and lower the production cost becomes very important for providing feasibility for popularizing the application of the nanomaterials in the development of the oil and gas fields.

Chinese Patent CN103127744A discloses a method of transferring oil phase nanoparticles into a water phase, and discloses the forming of an oil-in-water microemulsion by means of ultrasonic emulsification, wherein the microemulsion is evaporated and dried to get stabilizer-nanoparticle compounded dried jelly, and then polar solvents that can dissolve stabilizers are added into the nanoparticle compounded dried jelly, thereby realizing the goal of dispersing the nanoparticles into the polar solvents. In this method, the nanoparticles need to be coated with oleic acid or oleylamine, and are then dispersed in volatile non-polar organic agents, and additionally there is a need for adding additives such as absolute ethyl alcohol and stabilizers such as polyvinylpyrrolidone. The method of dispersing the nanoparticles into the water phase can not realize the goal of making use of the surfactants to regulate the hydrophilicity and the hydrophobicity of the nanoparticles within a rational range and then realizing the effect of foam stabilizing. The main goal of the patent is to disperse nanoparticles synthesized in the oil phase into the water phase to increase an application range, but in the patent the compounding system of the nanoparticles and the surfactants is not considered to be dispersed into the water phase.

SUMMARY OF THE INVENTION

Aiming at the deficiencies in prior art, the present invention provides an apparatus for preparing compound dispersoids of hydrophobic nanoparticles and surfactants, the hydrophobic nanoparticles are dispersed into surfactant solutions that can be compounded with the hydrophobic nanoparticles by an action of ultrasonic cavitation, and under the action of ultrasonic cavitation and by using the properties of high surface energy and high adsorbability of the dispersed nanoparticles, the surfactant molecules in the solution are enabled to be adsorbed on the surface of the nanoparticles, thus not only regulating the hydrophilicity and the hydrophobicity of the nanoparticles, but also by using the action of a repulsive force between surfactant molecules adsorbed on the surface of the nanoparticles, forming a stable dispersing system.

The present invention also provides a method of preparing the compound dispersoids of the hydrophobic nanoparticles and surfactants with the abovementioned preparing apparatus.

The technical solutions of the present invention lie in:

An apparatus for preparing compound dispersoids of hydrophobic nanoparticles and surfactants, comprises a water supply pipeline, a compounding mixing pipeline and an aggregating pipeline;
the compounding mixing pipeline comprises an ultrasonic dispersion instrument and a liquid storage tank connected in series into a loop, and a second plunger pump allowing unidirectional circulation of materials is arranged between the ultrasonic dispersion instrument and the liquid storage tank;
the water supply pipeline is connected to the top of the ultrasonic dispersion instrument;
and the aggregating pipeline is connected to a discharge end of the liquid storage tank.

According to the present invention, preferably, the ultrasonic dispersion instrument comprises an instrument barrel, wherein a first ultrafiltration membrane and a second ultrafiltration membrane are sequentially arranged up and down in the instrument barrel to divide the instrument barrel into three cavities: a first cavity, a second cavity and a third cavity, and a first ultrasonic transmitting probe is arranged in the first cavity; a second ultrasonic transmitting probe is arranged in the second cavity; a surfactant delivery pipeline is arranged on the barrel wall of the instrument barrel in a penetrating manner and communicated with the first cavity; and a hydrophobic nanoparticle delivery pipeline is arranged on the barrel wall of the instrument barrel in a penetrating manner and communicated with the second cavity.

According to the present invention, preferably, the ultrasonic dispersion instrument comprises a top lid movably opened and closed. Such design has the advantages of convenience in maintenance of the entire apparatus, and favorability of replacing or clearing the ultrafiltration membranes.

According to the present invention, preferably, the inner barrel wall of the instrument barrel is provided with a first snap ring and a second snap ring, and the first ultrafiltration membrane and the second ultrafiltration membrane are erected in the instrument barrel respectively via the first snap ring and the second snap ring.

According to the present invention, preferably, the water supply pipeline is connected with the ultrasonic dispersion instrument and the liquid storage tank via a three-way pipe; and the water supply pipeline comprises a liquid storage tank, a plunger pump and a flow meter.

According to the present invention, preferably, the aggregating pipeline is connected with the liquid storage tank and the ultrasonic dispersion instrument via a three-way pipe; and the aggregating pipeline comprises a compounding dispersoid storage tank and a third plunger pump.

According to the present invention, preferably, the instrument barrel is overall rectangular, a temperature control apparatus is arranged at the inner side of the barrel wall; a first ultrasonic transmitting probe or a second ultrasonic transmitting probe is respectively arranged on the barrel wall adjacent to the temperature control apparatus.

According to the present invention, preferably, a pore size of the first ultrafiltration membrane is 10 nm-100 nm, and a pore size of the second ultrafiltration membrane is 10 nm-100 nm. The first ultrafiltration membrane and the second ultrafiltration membrane are selected according to the experimental needs and are peripherally fixed by copper wires, the copper wires are wrapped by sealing rings, and the ultrafiltration membranes in the upper and lower layers are fixed by the snap rings on the inner wall of the cavity at a specific height. Effective frequency of the first ultrasonic transmitting probe and the second transmitting probe is 15 kHz-40 kHz, and the power is 2000 w; both the first ultrasonic transmitting probe and the second transmitting probe comprise a plurality of probes which are arranged by being vertical to the barrel wall, and an interval between adjacent probes is 5 cm.

A method for preparing compound dispersoids of hydrophobic nanoparticles and surfactants with the abovementioned preparing apparatus comprises the following steps:
(1) selecting the first ultrafiltration membrane and the second ultrafiltration membrane with suitable pore sizes according to the experimental requirements, mounting the second ultrafiltration membrane onto the second snap ring, and then mounting the first ultrafiltration membrane onto the first snap ring;
(2) tightly capping the top lid of the ultrasonic dispersion instrument, delivering a required mass of the surfactants from the surfactant delivery pipeline to the first cavity of the ultrasonic dispersion instrument, and delivering a required mass of the hydrophobic nanoparticles from the hydrophobic nanoparticle delivery pipeline to the second cavity of the ultrasonic dispersion instrument; closing the surfactant delivery pipeline and the hydrophobic nanoparticle delivery pipeline after finishing the delivery;
(3) utilizing the first plunger pump to inject water in the water storage tank into the ultrasonic dispersion instrument; using a flow meter to record the amount of the injected water;
(4) after injecting the water, circulating the hydrophobic nanoparticles, the surfactants and water unidirectionally in the compounding mixing pipeline through the second plunger pump, and opening the first ultrasound transmitting probe and the second ultrasound transmitting probe, wherein during the circular flow process of the water body within the ultrasonic dispersion instrument, water is first mixed with the surfactants in the upper space within the ultrasonic dispersion instrument to form a dispersion solution of the surfactants and water under the action of the ultrasonic cavitation of the first ultrasound transmitting probe, then, the dispersion solution enters the second cavity through the first ultrafiltration membrane, and the part of the dispersion solution that fails to meet the size requirement of the first ultrafiltration membrane will be retained in the first cavity and can't enter the second cavity before the particle size meets the size requirement of the first ultrafiltration membrane through the ultrasonic cavitation of the first ultrasound transmitting probe;

(5) mixing the dispersion solution of the surfactants and water that enter the second cavity with the hydrophobic nanoparticles, wherein under the action of the ultrasonic cavitation of the second ultrasound transmitting probe, the hydrophobic nanoparticles are violently moved under the provision of external energy to be dispersed, in addition, in a dispersion process, as the hydrophobic nanoparticles have the features of high surface energy and adsorbability, the surfactants adsorb on the surface of the hydrophobic nanoparticles, thus improving the dispersion stability;

(6) enabling the compound dispersoids of the hydrophobic nanoparticles and the surfactants that are dispersed into an appropriate size to enter the third cavity through the second ultrafiltration membrane, and circulating again to the ultrasonic dispersion instrument through the liquid storage tank and the second plunger pump;

(7) recirculating steps (1)-(6) to form compound dispersoids of the hydrophobic nanoparticles and the surfactants;

(8) circulating the compound dispersoids of the hydrophobic nanoparticles and the surfactants to the liquid storage tank;

(9) communicating the aggregating pipeline with the liquid storage tank, and collecting the compound dispersoids to a compound dispersoid storage tank through utilizing the third plunger pump.

The present invention has the following advantages and prominent effects:

1. The apparatus and method described in the present invention realize the preparation and production of the compound dispersoids of the hydrophobic nanoparticles and the surfactants, thus not only meeting the demand of a laboratory-grade dosage, but also satisfying the need of injection of multiple well groups and large dose in operating regions of oilfields;

2. The apparatus and method described in the present invention utilize a physical-chemical action mechanism that combines the action of ultrasonic cavitation and the surfactant-nanoparticle surface high-efficiency adsorption to realize the stable dispersion of the hydrophobic nanoparticles in a water phase, and enable the hydrophobic nanoparticles to be applied to a stable foam system of the nanoparticles as well;

3. The apparatus and method described in the present invention can control dispersion particle sizes of the nanoparticles in the compound dispersoids according to the demands of experiments or on-site construction through control over the size of the bore diameter of the ultrafiltration membranes, thus meeting the requirement that different foam systems require compound dispersoids of various dispersion particle sizes, and realizing the effect of foam stabilizing;

4. As the apparatus and method described in the present invention can disperse hydrophobic nanoparticles in the water phase stably, the apparatus and method described in the present invention increase the probability of contact and adsorption between the nanoparticles and the surfactants, thus improving the adsorption and compounding efficiency of the nanoparticles and the surfactants, reducing the usage amount of the two, saving costs and providing economic feasibility for the application of the nanoparticles in the development of oil and gas fields;

5. The compound dispersoids of the hydrophobic nanoparticles and the surfactants prepared by the apparatus and method described in the present invention have low viscosity and good flowability and stability, and are convenient for on-site production and injection. Moreover, during injecting, both an injection means of ground foaming injection and an injection means of plug-type injection ground foaming with an air source section can be adopted, and on-site needs are met.

BRIEF DESCRIPTION OF THE DRAWINGS

In FIG. 4, a compound dispersoid solution in a test tube No. 1 is prepared by the conventional methods, i.e. concentration of $SiO_2$ in the compound dispersoids is controlled to be 1%, concentration of AOT is controlled to be 0.4%, and then the final product is prepared by stirring with a magnetic stirrer at a speed of 1000 rpm for 30 min;

In FIG. 4, test tubes No. 2, No. 3, No. 4 and No. 5 correspond to the pictures of the compound dispersoids obtained in embodiments 7-10 respectively.

In FIG. 1-FIG. 3, 1 is a water supply pipeline, 2 is a compounding mixing pipeline, 3 is an aggregating pipeline, 4 is an ultrasonic dispersion instrument, 5 is a liquid storage tank, 6 is a second plunger pump, 7 is an instrument barrel, 8 is a first ultrafiltration membrane, 9 is a second ultrafiltration membrane, 10 is a first cavity, 11 is a second cavity, 12 is a third cavity, 13 is a first ultrasonic transmitting probe, 14 is a second ultrasonic transmitting probe, 15 is a surfactant delivery pipeline, 16 is a hydrophobic nanoparticle delivery pipeline, 17 is a top lid, 18 is a first snap ring, 19 is a second snap ring, 20 is a water storage tank, 21 is a first plunger pump, 22 is a flow meter, 23 is a compound dispersoid storage tank, 24 is a third plunger pump, 25 is a temperature control apparatus; 26 is a bolt for fixing the top lid, 27 is a seal ring for sealing the top lid, 28 is a valve.

DETAILED DESCRIPTION OF THE INVENTION

Principles, specific structures and preferred embodiments provided by the present invention will be further described with reference to the accompanying drawings, but not limited to it.

Embodiment 1

Figure 1:
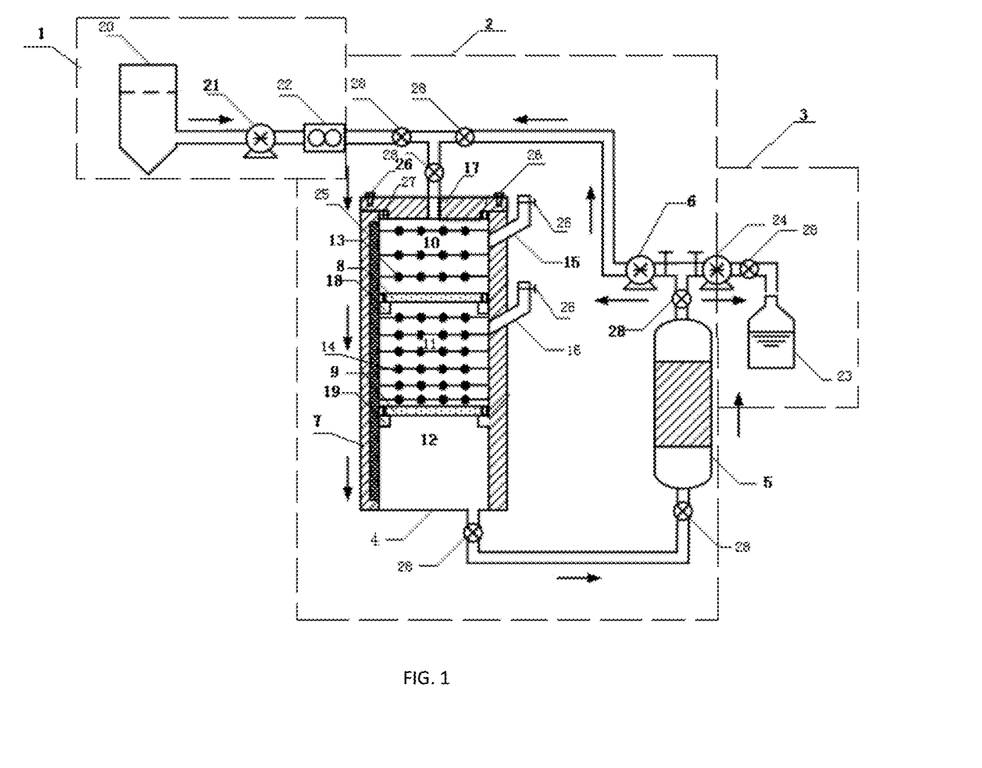
FIG. 1 is a schematic view of an integral structure of an apparatus for preparing compound dispersoids of hydrophobic nanoparticles and surfactants according to the present invention.

An apparatus for preparing compound dispersoids of hydrophobic nanoparticles and surfactants comprises a water supply pipeline 1, a compounding mixing pipeline 2 and an aggregating pipeline 3;
the compounding mixing pipeline 2 includes an ultrasonic dispersion instrument 4 and a liquid storage tank 5 connected in series into a loop, and a second plunger pump 6 allowing unidirectional circulation of materials is arranged between the ultrasonic dispersion instrument 4 and the liquid storage tank 5;
the water supply pipeline 1 is connected to the top of the ultrasonic dispersion instrument 4;
and the aggregating pipeline 3 is connected to a discharge end of the liquid storage tank 5.

Embodiment 2

Figure 3:
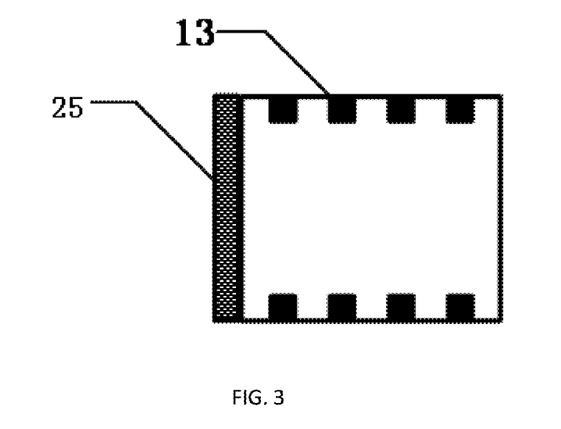
FIG. 3 is a top sectional view of the interior of the ultrasonic dispersion instrument.

Embodiment 2 differs from the apparatus for preparing compound dispersoids of hydrophobic nanoparticles and surfactants in embodiment 1 in that the ultrasonic dispersion instrument 4 comprises an instrument barrel 7, wherein a first ultrafiltration membrane 8 and a second ultrafiltration membrane 9 are sequentially arranged in the instrument barrel 7 from top to bottom, and divide the instrument barrel into three cavities: a first cavity 10, a second cavity 11 and a third cavity 12, and a first ultrasonic transmitting probe 13 is arranged in the first cavity 10; a second ultrasonic transmitting probe 14 is arranged in the second cavity 11; a surfactant delivery pipeline 15 is arranged on a barrel wall of the instrument barrel 7 in a penetrating manner and communicated with the first cavity 10; and a hydrophobic nanoparticle delivery pipeline 16 is arranged on a barrel wall of the instrument barrel 7 in a penetrating manner and communicated with the second cavity 11.

Embodiment 3

Figure 2:
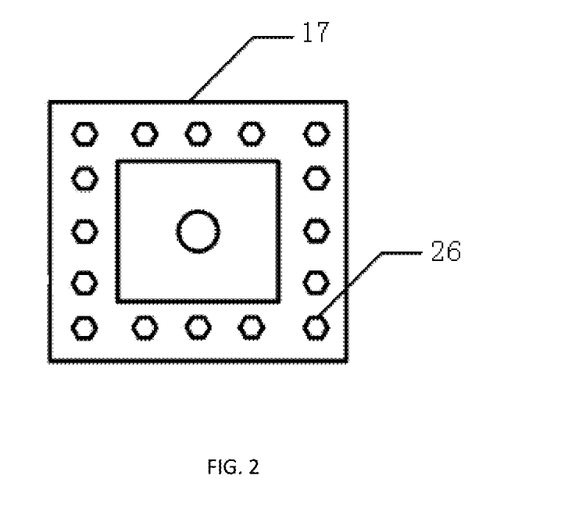
FIG. 2 is a top view of a top lid of an ultrasonic dispersion instrument.

Embodiment 3 differs from the apparatus for preparing compound dispersoids of hydrophobic nanoparticles and surfactants in embodiments 1-2 in that the ultrasonic dispersion instrument includes a movably opened and closed top lid 17.
The inner barrel wall of the said instrument barrel 7 is provided with a first snap ring 18 and a second snap ring 19, and the first ultrafiltration membrane 8 and the second ultrafiltration membrane 9 are respectively erected in the instrument barrel 7 via the first snap ring 18 and the second snap ring 19.

Embodiment 4

Embodiment 4 differs from the apparatus for preparing compound dispersoids of hydrophobic nanoparticles and surfactants in embodiment 1 in that the water supply pipeline 1 is connected to the ultrasonic dispersion instrument 4 and the liquid storage tank 5 via a three-way pipe; the water supply pipeline 1 comprises a water storage tank 20, a first plunger pump 21 and a flow meter 22.
the aggregating pipeline 3 is connected with the liquid storage tank 5 and the ultrasonic dispersion instrument 4 via a three-way pipe; the aggregating pipeline 3 comprises a compound dispersoid storage tank 23 and a third plunger pump 24.

Embodiment 5

Embodiment 5 differs from the apparatus for preparing compound dispersoids of hydrophobic nanoparticles and surfactants in embodiment 4 in that the instrument barrel 7 is overall rectangular, and a temperature control apparatus 25 is provided at the inner side of the barrel wall; a first ultrasonic transmitting probe 13 or a second ultrasonic transmitting probe 14 is respectively arranged on the barrel wall adjacent to the temperature control apparatus 25.

Embodiment 6

Embodiment 6 differs from the apparatus for preparing compound dispersoids of hydrophobic nanoparticles and surfactants in embodiments 1-5 in that a pore size of the first ultrafiltration membrane 8 is 10 nm-100 nm, and a pore size of the second ultrafiltration membrane 9 is 10 nm-100 nm, the first ultrafiltration membrane and the second ultrafiltration membrane are selected according to the experimental needs and are peripherally fixed by copper wires, the copper wires are wrapped by sealing rings, and the ultrafiltration membranes in the upper and lower layers are fixed by the snap rings on the inner wall of the cavity at a specific height. Effective frequency of the first ultrasonic transmitting probe and the second ultrasonic transmitting probe is 15 kHz-40 kHz, and the power is 2000 w; the first ultrasonic transmitting probe and the second ultrasonic transmitting probe both comprise a plurality of probes arranged by being vertical to the barrel wall, and an interval among the adjacent probes is 5 cm.

Embodiment 7

A method for preparing compound dispersoids of hydrophobic nanoparticles and surfactants with the abovementioned preparing apparatus as described in embodiments 1-6 comprises the following steps:
(1) selecting the first ultrafiltration membrane 8 and the second ultrafiltration membrane 9 with suitable pore sizes according to the experimental requirements, mounting the second ultrafiltration membrane 9 onto the second snap ring 19, and then mounting the first ultrafiltration membrane 8 onto the first snap ring 18, wherein the pore size of the first ultrafiltration membrane 8 and the second ultrafiltration membrane 9 is 30-50 nm; then mounting a sealing ring 27 on the top lid of the ultrasonic dispersion instrument, and at last fixing the top lid 17 of the ultrasonic dispersion instrument with a bolt 26;
(2) tightly capping the top lid 17 of the ultrasonic dispersion instrument, delivering a required mass of surfactants to the first cavity 10 of the ultrasonic dispersion instrument 4 with a surfactant delivery pipeline, i.e. adding 20 g of di(2-ethyl hexyl) sodium sulphosuccinate (AOT); delivering a required mass of hydrophobic nanoparticles to the second cavity 11 of the ultrasonic dispersion instrument 4 with a hydrophobic nanoparticle delivery pipeline, i.e. adding 100 g of hydrophobic nanometer silica particles, wherein particle size of the hydrophobic nanometer silica particles is 20 nm; closing the surfactant delivery pipeline 15 and the hydrophobic nanoparticle delivery pipeline 16 after finishing the delivery;
(3) utilizing a first plunger pump 21 to inject water in a liquid storage tank into the ultrasonic dispersion instrument 4; controlling injection of water to be 10 L, i.e. controlling concentration of $SiO_2$ in the compound dispersoids to be 1%, concentration of AOT to be 0.2%, and a concentration ratio of AOT to $SiO_2$ to be 0.2;
(4) after injecting the water, circulating the hydrophobic nanoparticles, the surfactants and the water unidirectionally within the compounding mixing pipeline via a second plunger pump 6, and opening the first ultrasonic transmitting probe 13 and the second ultrasonic transmitting probe 14, wherein during the circular flow process of a water body within the ultrasonic dispersion instrument 4, water is firstly mixed with the surfactants in the upper space within the ultrasonic dispersion instrument 4 to form a dispersion solution of the surfactants and water under the action of ultrasonic cavitation of the first ultrasonic transmitting probe 13, then, the dispersion solution enters the second cavity 11 via the first ultrafiltration membrane 8, and the part of the dispersion solution that fails to meet the size requirement of the first ultrafiltration membrane 8 will be retained in the first cavity 10 and cannot enter the second cavity 11 until its particle size meets the size requirement of the first ultrafiltration membrane 8 through the action of ultrasonic cavitation by the first ultrasonic transmitting probe 13, a closed circulation loop is formed between the ultrasonic dispersion instrument and the liquid storage tank, and the first ultrasonic transmitting probe 13 and the second transmitting probe 14 are opened at the same time with an effective frequency set to be 20 kHz, the temperature control apparatus 25 is opened and the temperature is set to be 25° C. constantly;

(5) mixing the dispersion solution of the surfactants and water entering the second cavity 11 with the hydrophobic nanoparticles, wherein under ultrasonic cavitation of the second ultrasound transmitting probe 14, the hydrophobic nanoparticles are violently moved under provision of external energy to be dispersed, the surfactants are adsorbed on the surfaces of the hydrophobic nanoparticles to improve the dispersion stability in the dispersion process because of the fact that the hydrophobic nanoparticles have characteristics of high surface energy and adsorbability;

(6) enabling the compound dispersoids of the hydrophobic nanoparticles and the surfactants dispersed into appropriate sizes to enter the third cavity 12 via a second ultrafiltration membrane 9, and then circulating again to the ultrasonic dispersion instrument 4 via a liquid storage tank 5 and a second plunger pump 6;

(7) recirculating steps (1)-(6) to form compound dispersoids of the hydrophobic nanoparticles and the surfactants;

(8) circulating the compound dispersoids of the hydrophobic nanoparticles and the surfactants to the liquid storage tank 5;

(9) connecting the aggregating pipeline 3 with the liquid storage tank 5, and collecting the compound dispersoid to a compound dispersoid storage tank 23 by utilizing the third plunger pump 24, wherein after the process is circulated for set times, the compound dispersoids of the hydrophobic nanoparticles and the surfactants in the ultrasonic dispersion instrument 24 and the liquid storage tank 27 are pumped in a compound dispersion tank 34 via a plunger pump 32, such that the compound dispersoids of the hydrophobic nanoparticles and the surfactants are obtained.

Embodiment 8

Embodiment 8 differs from the method for preparing the compound dispersoids of the hydrophobic nanoparticles and the surfactants in embodiment 7 in that a required mass of surfactants is delivered into the first cavity 10 of the dispersion instrument 4 via a surfactant delivery pipeline 15, 40 g of AOT is added, i.e. concentration of $SiO_2$ in the compound dispersoids is controlled to be 1%, concentration of AOT is controlled to be 0.4% and a concentration ratio of AOT to $SiO_2$ is 0.4.

Embodiment 9

Embodiment 9 differs from the method for preparing the compound dispersoids of the hydrophobic nanoparticles and the surfactants in embodiment 7 in that a required mass of surfactant is delivered into the first cavity 10 of the dispersion instrument 4 via a surfactant delivery pipeline 15, 60 g of AOT is added, i.e. concentration of the $SiO_2$ in the compound dispersoids is controlled to be 1%, concentration of AOT is controlled to be 0.6% and the concentration ratio of AOT to $SiO_2$ is 0.6.

Embodiment 10

Embodiment 10 differs from the method for preparing the compound dispersoids of the hydrophobic nanoparticles and the surfactants in embodiment 7 in that a required mass of surfactants is delivered into the first cavity 10 of the dispersion instrument 4 via a surfactant delivery pipeline 15, 60 g of SDS is added, i.e. concentration of the $SiO_2$ in the compound dispersoids is controlled to be 1%, concentration of SDS is controlled to be 0.6% and a concentration ratio of SDS to $SiO_2$ is 0.6.

Figure 4:
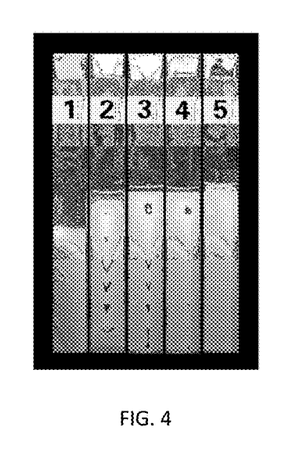
FIG. 4 is a comparative picture of the compound dispersoids obtained in embodiments 7-10 and the compound dispersoids prepared by conventional methods.

FIG. 4 is a comparative picture of the compound dispersoids obtained in embodiments 7-10, the compound dispersoid solution in a test tube No. 1 of FIG. 4 is prepared by conventional methods, i.e. concentration of $SiO_2$ in the compound dispersoid is controlled to be 1%, concentration of AOT is controlled to be 0.4%, and then the final product is prepared by stirring with a magnetic stirrer at a speed of 1000 rpm for 30 min; test tubes No. 2, No. 3, No. 4 and No. 5 in FIG. 4 respectively correspond to the pictures of the compound dispersoids obtained in embodiments 7-10.

Figure 5:
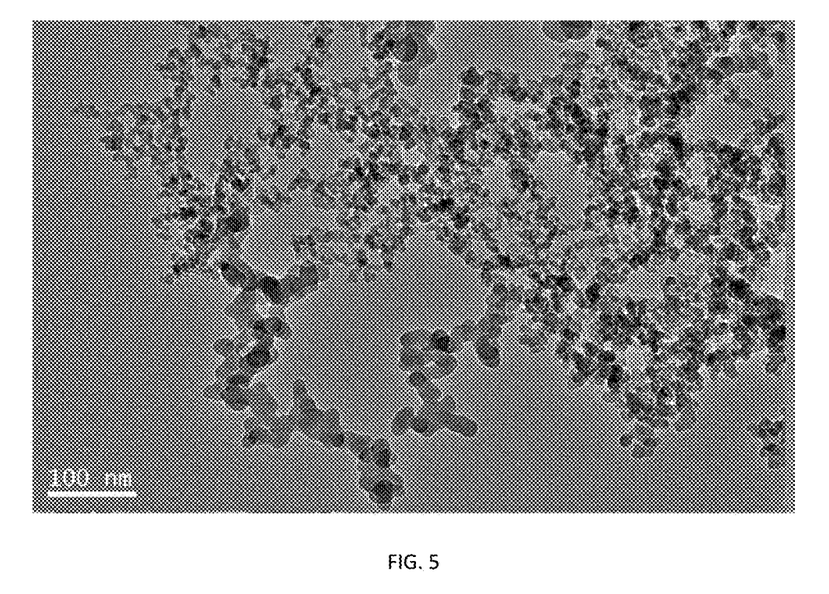
FIG. 5 is a TEM photomicrograph of the compound dispersoids prepared by conventional methods.
Figure 6:
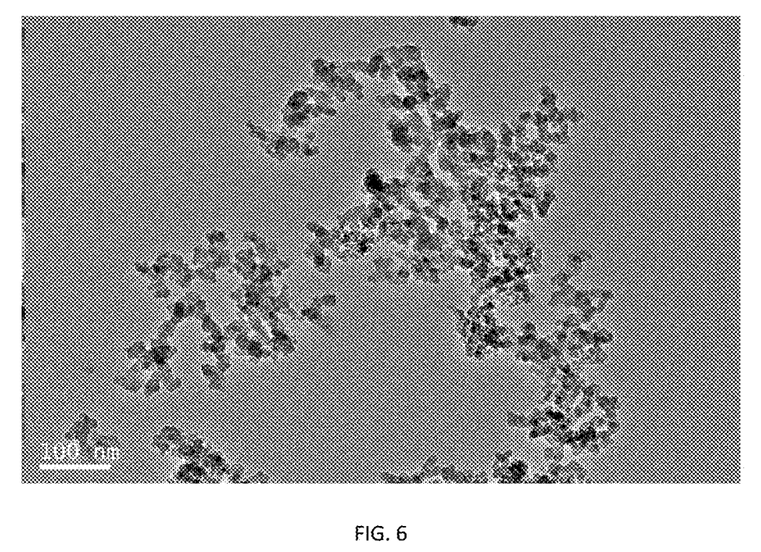
FIG. 6-FIG. 9 are TEM photomicrographs of the compound dispersoids obtained in embodiments 7-10.
Figure 7:
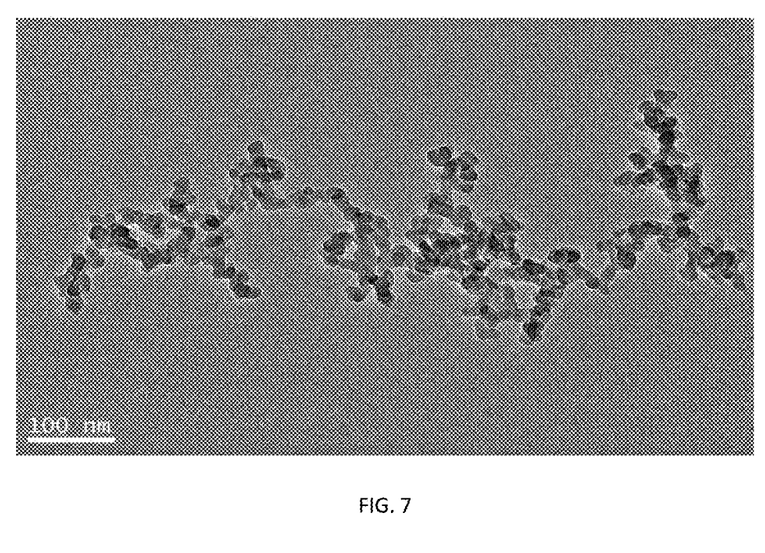
Figure 8:
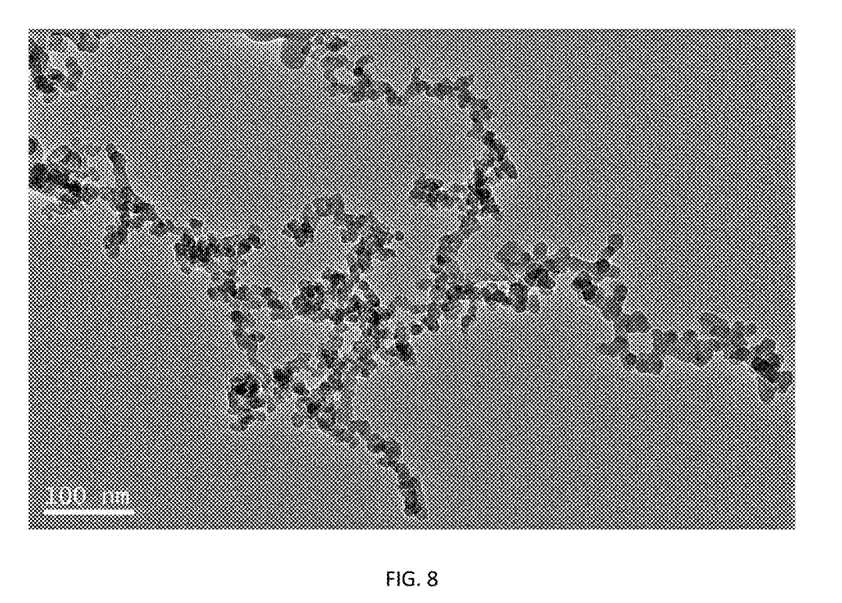
Figure 9:
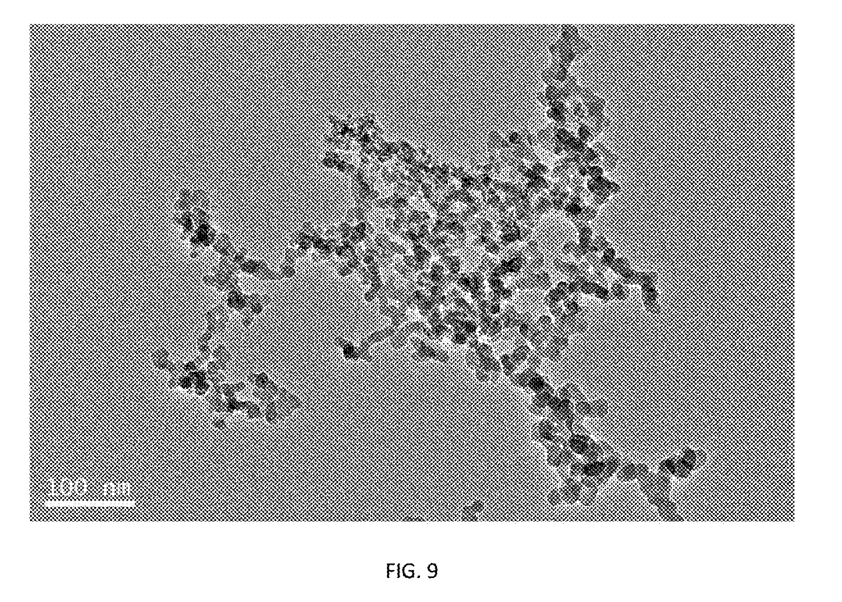

FIG. 5 is a TEM photomicrograph of the compound dispersoids prepared by the conventional methods; FIG. 6-FIG. 9 are TEM photomicrographs of the compound dispersoids obtained in embodiments 7-10. It can be seen from comparison that agglomeration clearly takes place in the nanoparticles in the compound dispersoids prepared with the conventional methods, larger cluster structures are formed, while the compound dispersoids prepared with the apparatus and method of the present invention show a very good dispersion state which is the best in picture No. 3 (i.e. when the concentration ratio of AOT to $SiO_2$ in embodiment 8 is 0.4).

What is claimed is:

1. A method for preparing a complex dispersion of hydrophobic nanoparticles and surfactants with a dispersion apparatus,
wherein the dispersion apparatus comprises a water supply pipeline, a complex mixing pipeline and a material collecting pipeline;
the complex mixing pipeline comprises an ultrasonic disperser and a fluid reservoir that are connected in series, and a first plunger pump for one-way circulation of materials is provided between the ultrasonic disperser and the fluid reservoir;
the water supply pipeline is connected with a top of the ultrasonic disperser;
the material collecting pipeline is connected with a material outlet of the fluid reservoir;
the ultrasonic disperser comprises an instrumental barrel, a first ultrafiltration membrane and a second ultrafiltration membrane are disposed in the instrumental barrel up and down in succession which divide the instrumental barrel into three cavities, which are: a first cavity with a first ultrasonic emission probe disposed therein, a second cavity with a second ultrasonic emission probe disposed therein and a third cavity; a wall of the instrumental barrel is provided with a through surfactant delivery pipe connected to the first cavity; and the wall of the instrumental barrel is provided with a through hydrophobic nanoparticles delivery pipe connected to the second cavity;

wherein the method comprises the following steps:
(1) the first and second ultrafiltration membranes of suitable aperture sizes are selected according to experimental requirements, the second ultrafiltration membrane is mounted on a second snap ring first, and then the first ultrafiltration membrane is mounted on a first snap ring;
(2) a top cap of the ultrasonic disperser is fastened down, surfactants are added into the first cavity of the ultrasonic disperser through the surfactant delivery pipe, and hydrophobic nanoparticles are added into the second cavity of the ultrasonic disperser through the hydrophobic nanoparticle delivery pipe; the surfactant delivery pipe and the hydrophobic nanoparticle delivery pipe are closed after delivery;
(3) water in a water reservoir is injected into the ultrasonic disperser by the first plunger pump;
(4) after the water is injected, the hydrophobic nanoparticles and the surfactants are enabled to carry out one-way circulation in the complex mixing pipeline by a second plunger pump, and the first and second ultrasonic emission probes are started; during the process of water circulation in the ultrasonic disperser, at first, water is mixed with the surfactants in a upper room of the ultrasonic disperser, a dispersion solution of surfactants and water is formed under ultrasonic cavitation effects of the first ultrasonic emission probe and enters the second cavity through the first ultrafiltration membrane, part of the solution that meets not the standard of the first ultrafiltration membrane size is detained in the first cavity without entering the second cavity until the particle size thereof meets the standard of the first ultrafiltration membrane size after ultrasonic cavitation by the first ultrasonic emission probe;

(5) the dispersion solution of surfactants and water entering the second cavity is mixed with the hydrophobic nanoparticles;

(6) the complex dispersion of hydrophobic nanoparticles dispersed into suitable sizes and surfactants enters into the third cavity through the second ultrafiltration membrane, and then is cycled to the ultrasonic disperser through the fluid reservoir and the second plunger pump;

(7) steps (1) to (6) are repeated and cycled to form the complex dispersion of hydrophobic nanoparticles and surfactants;

(8) the complex dispersion of hydrophobic nanoparticles and surfactants is cycled to the fluid reservoir;

(9) connection between the material collecting pipeline and the fluid reservoir is enabled, the dispersion is collected to a complex dispersion reservoir by a third plunger pump.

* * * * *